(146.) WILLIAM H. BARTHOLOMEW.

Rubber Eraser.

No. 121,982. Patented Dec. 19, 1871.

Witnesses.
J. R. Nottingham
C. B. Nottingham

Inventor.
William H. Bartholomew
by A. Pollok
his attorney

ID

UNITED STATES PATENT OFFICE.

WILLIAM N. BARTHOLOMEW, OF NEWTON CENTRE, MASSACHUSETTS, ASSIGNOR TO JOSEPH RECKENDORFER, OF NEW YORK CITY, N. Y.

IMPROVEMENT IN RUBBER ERASERS.

Specification forming part of Letters Patent No. 121,982, dated December 19, 1871.

*To all whom it may concern:*

Be it known that I, WILLIAM N. BARTHOLOMEW, of Newton Centre, in the county of Middlesex and State of Massachusetts, have invented certain new and useful Improvements in Rubber Erasers, of which the following is a specification:

My invention consists of a rubber eraser, formed of a solid stick of vulcanizable erasive-rubber compound, in combination with a sheath of paper, leather, or equivalent material, surrounding the rubber stick and united therewith by means of glue or other cement which, when dry, becomes hard. The rubber, when made in the form of a stick, or so as to have a pencil-like shape, is very convenient to handle and to carry. But alone, it would be too soft and easily bent to permit of its being of much practical use, and would, moreover, be liable to become soiled and dirty from contact with the hand or clothing, or exposure on the desk or other place where it might be used. The paper or leather sheath, fitting closely around and united with it by glue or other cement which will harden on drying, imparts to it the necessary stiffness, while it (the sheath) can be cut away to expose fresh portions of the rubber as the ends wear away, and covers and protects such part of the rubber stick as is held in the hand, or is not in actual use for rubbing purposes.

In the accompanying drawing I have represented the manner in which my invention may be carried into effect.

Figure 1:
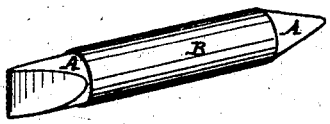
Figure 2:
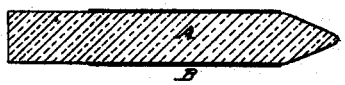

Figure 1 is a perspective view of the eraser. Fig. 2 is a longitudinal section of the same.

The general form of the eraser is cylindrical, but it may be of other form in cross-section, like the so-called "polygonal" pencil, for instance, preserving, however, in all cases its distinctively pencil-like shape, which is that which gives the eraser its value, enabling it to be held and handled like an ordinary lead pencil, and indeed to be cut and sharpened or shaped at the ends like one, the sheath covering all such portions of rubber as are not actually in use.

A is the rubber stick, made of a suitable erasive compound, molded and vulcanized in the usual way. B is the sheath of paper or leather wrapped tightly around or otherwise fitted closely to and upon the rubber. The two are united by glue or other cement which, like glue, will harden on drying, and thus give stiffness to the sheath to aid it in upholding and preventing the bending of the rubber.

What I claim as my invention is—

A rubber eraser, composed of a stick or pencil of vulcanized rubber erasive compound, of distinctively pencil-like form, and a surrounding sheath of paper, leather, or equivalent material, the two being united by glue or other cement, which, like glue, will harden on drying, substantially as herein shown and set forth.

In testimony whereof I have signed my name to this specification before two subscribing witnesses.

WM. N. BARTHOLOMEW.

Witnesses:
A. POLLOK,
S. EDWIN IRESON.

(146)